(12) United States Patent
Ui

(10) Patent No.: US 6,337,720 B1
(45) Date of Patent: Jan. 8, 2002

(54) BUILT-IN MONITOR APPARATUS

(75) Inventor: Hiroyuki Ui, Chiba (JP)

(73) Assignee: Tecmo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,816

(22) Filed: Dec. 20, 1999

Related U.S. Application Data

(63) Continuation of application No. 07/986,617, filed on Dec. 7, 1992, now Pat. No. 6,005,641.

(30) Foreign Application Priority Data

Jul. 12, 1991 (JP) ............................................. 3-109010

(51) Int. Cl.$^7$ .............................................. H04N 5/655
(52) U.S. Cl. ........................ 348/827; 348/839; 312/7.2
(58) Field of Search .................................. 348/836, 839, 348/837, 826, 825, 827; 463/46; 248/919, 920, 924; 312/7.2, 223.2

(56) References Cited

U.S. PATENT DOCUMENTS

| | | | |
|---|---|---|---|
| 2,779,642 A | | 1/1957 | Matthews |
| 3,940,136 A | * | 2/1976 | Runte ....................... 273/85 R |
| 4,084,194 A | | 4/1978 | Hector |
| 4,203,636 A | | 5/1980 | Wells |
| 4,440,457 A | | 4/1984 | Fogelman et al. |
| 4,638,969 A | | 1/1987 | Brown |
| 4,643,382 A | | 2/1987 | Ojima et al. |
| 4,657,316 A | * | 4/1987 | Hardt et al. .................. 312/7.2 |
| 4,687,167 A | | 8/1987 | Skalka et al. |
| 4,706,920 A | | 11/1987 | Ojima et al. |
| 4,729,533 A | * | 3/1988 | Hillary ....................... 248/184 |
| 4,739,316 A | * | 4/1988 | Yamaguchi et al. ........ 340/711 |
| 4,848,744 A | | 7/1989 | Steininger et al. |
| 4,852,500 A | * | 8/1989 | Ryburg et al. .............. 108/105 |
| 5,134,390 A | | 7/1992 | Kishimoto et al. |
| 5,357,873 A | * | 10/1994 | Hilton ......................... 108/50 |

FOREIGN PATENT DOCUMENTS

| | | |
|---|---|---|
| EP | 0 230 291 | 7/1987 |
| EP | 0 370 155 | 5/1990 |
| EP | 546477 | 6/1993 |
| JP | 60-82690 | 6/1985 |
| JP | 1-33118 | 10/1989 |
| JP | 3-64522 | 6/1991 |
| JP | 3-80785 | 8/1991 |
| WO | WO 87/02858 | 5/1987 |

* cited by examiner

*Primary Examiner*—Victor R. Kostak
(74) *Attorney, Agent, or Firm*—Pillsbury Winthrop LLP

(57) ABSTRACT

A built-in monitor apparatus such as an electronic game machine and etc., which is adapted to allow a built-in monitor unit having a rectangular picture screen to rotate in a 90-degree arc. This built-in monitor apparatus comprises; a monitor unit comprising a cathode-ray tube; a base unit comprising a frame for rotatably supporting the monitor unit, and a stretchable damper biased to be moved forward, each end of the damper being pivotally connected to a portion between the frame and said casing; a guide roller mounted on the frame and adapted to slide along a guide rail provided within the casing; and a locking means for restraining the movement of the frame.

4 Claims, 10 Drawing Sheets

BUILT-IN MONITOR APPARATUS

This is a continuation of application Ser. No. 07/986,617, filed on Dec. 7, 1992 now U.S. Pat. No. 6,005,641.

BACKGROUND OF THE INVENTION

1. Field of the Invention

This invention relates to a built-in monitor apparatus such as an electronic game machine and etc., which is adapted to allow a built-in monitor unit having a rectangular picture screen to rotate in a 90-degree arc.

2. Description of the Prior Art

There is a recent trend to enlarge the size of the picture screen of an electronic game machine, for example up to 22–30 inches. On the other hand, there is a demand to minimize the casing for the electronic game machine as small as possible in view of a limited space for installing a number of the electronic game machines in a play room. It is also desirable to array the casings of the electronic game machines as close as possible to each other for effectively utilizing a limited installation space for the electronic game machines. Under these circumstances, it has become increasingly troublesome for an operator to change over the oblong picture screen of an electronic game machine from the vertically elongated state to the horizontally elongated state, and vice versa. Therefore, innovation on this point is now demanded in the art.

Conventionally the change-over of the oblong picture screen of an electronic game machine has been conducted as follows. First, the wirings of a monitor unit and fixing screws are detached from the casing thereof, and then the monitor unit is taken out of the casing of the electronic game machine. Thereafter, the monitor unit is turned to change the posture of the picture screen, i. e. from the vertically elongated state to the horizontally elongated state, and then the monitor unit is returned to the inside of the casing thereof. Finally, the fixings of wirings and fixing screws are conducted.

There has been also proposed as an alternative system a mechanism for rotating the oblong picture screen of an electronic game machine, in which the monitor unit is mounted on a rotatable disc so as to be rotated together with the disc.

However, the former mechanism in which the monitor unit is once taken out of the casing and, after effecting the change-over of the posture of the picture screen, returned to the casing is suffered from problems in that as the monitor unit becomes larger in size and heavier in weight, the more it becomes difficult to conduct the change-over operation.

The latter mechanism of rotating the monitor unit in a 90-degree arc together with the mounting disc is also suffered from problems in that in order to allow the rotation of monitor unit the area of monitor-mounting side of the casing is required to be equal to or larger in size than a square area encircled by four sides, each having a length corresponding to the diagonal line of the picture screen of the monitor unit, thereby inevitably causing an increase in size of the casing.

SUMMARY OF THE INVENTION

Accordingly, one of the object of the present invention is to provide a built-in monitor apparatus such as an electronic game machine and etc., with which the change-over of the posture of the picture screen thereof can be easily conducted, and at the same time the outer size of the casing thereof as well as the installing space thereof can be minimized as small as possible.

The object has been attained according to the present invention by providing a built-in monitor apparatus wherein an rectangular picture screen housed in a casing is adapted to be changed from a vertically elongated state to a horizontally elongated state, and vice versa; which is characterized to comprise;

a monitor unit comprising a cathode-ray tube;

a base unit comprising a frame for rotatably supporting said monitor unit, and a stretchable damper biased to be moved forward, each end of said damper being pivotally connected to a portion between said frame and said casing;

a guide roller mounted on said frame, and adapted to slide along a guide rail provided within said casing; and a locking means for restraining the movement of said frame within a prescribed position of said casing.

The monitor unit may comprise; a cathode-ray tube; an escutcheon surrounding the periphery of the picture screen of the cathode-ray tube; a transparent door for covering the upper surface of the picture screen; a box-like upper frame sustaining and supporting the cathode-ray tube, while surrounding the outer wall of the cathode-ray tube; a plate disposed behind the upper frame and having a circular through-hole which is disposed concentrical with the axis of the cathode-ray tube; and a bracket for guiding the rotation of the cathode-ray tube, which is arranged along arc of the circular through-hole of the plate.

The base unit may comprise a monitor rotating plate having a ring-like plane, which is adapted to be engaged via the roller mechanisms with the bracket; a plurality of ball castors mounted at prescribed intervals on the upper surface of the monitor rotating plate so as to be contacted with the back surface of the plate; a pair of roller kept apart from each other for rotating the cathode-ray tube, which are mounted on the upper surface of the monitor rotating plate, and adapted to contact with the lower surface of the bracket so as to rotatably support the the bracket; a monitor rotating plate-fixing bracket for fixing the monitor rotating plate; a lower frame for supporting and securing the monitor rotating plate-fixing bracket; and a stretchable damper, whose upper portion is rotatably connected to the rear portion of the lower frame so as to support the lower frame while allowing ascending and descending movement thereof.

In the operation of converting the posture of the picture screen of the built-in monitor apparatus, the whole monitor unit is obliquely lifted to be taken out of the casing together with the base unit to such an extent that the rotational movement of the monitor unit is no more hindered by the frame of the casing, and then the whole monitor unit is rotated together with the transparent door to convert the posture of the picture screen. Since the monitor unit is rotatably supported in front of the monitor rotating plate of the base plate by means of a flat plate disposed at the rear portion of the monitor unit, as well as by a cathode-ray tube rotating bracket, the posture of the whole monitor unit can be easily converted together with the transparent door.

In this posture conversion operation, the locking mechanism is first released so as to effectively utilize the energized force of the stretchable damper so that the monitor unit can be easily moved forward along the guide rail.

After finishing the posture-conversion operation of the monitor unit, the monitor unit is descended back as a whole to the original position in the casing.

DESCRIPTION OF THE PREFERRED EMBODIMENT OF THE INVENTION

This invention will be further explained with reference to an embodiment where the present invention is applied to a television game machine.

Figure 1:
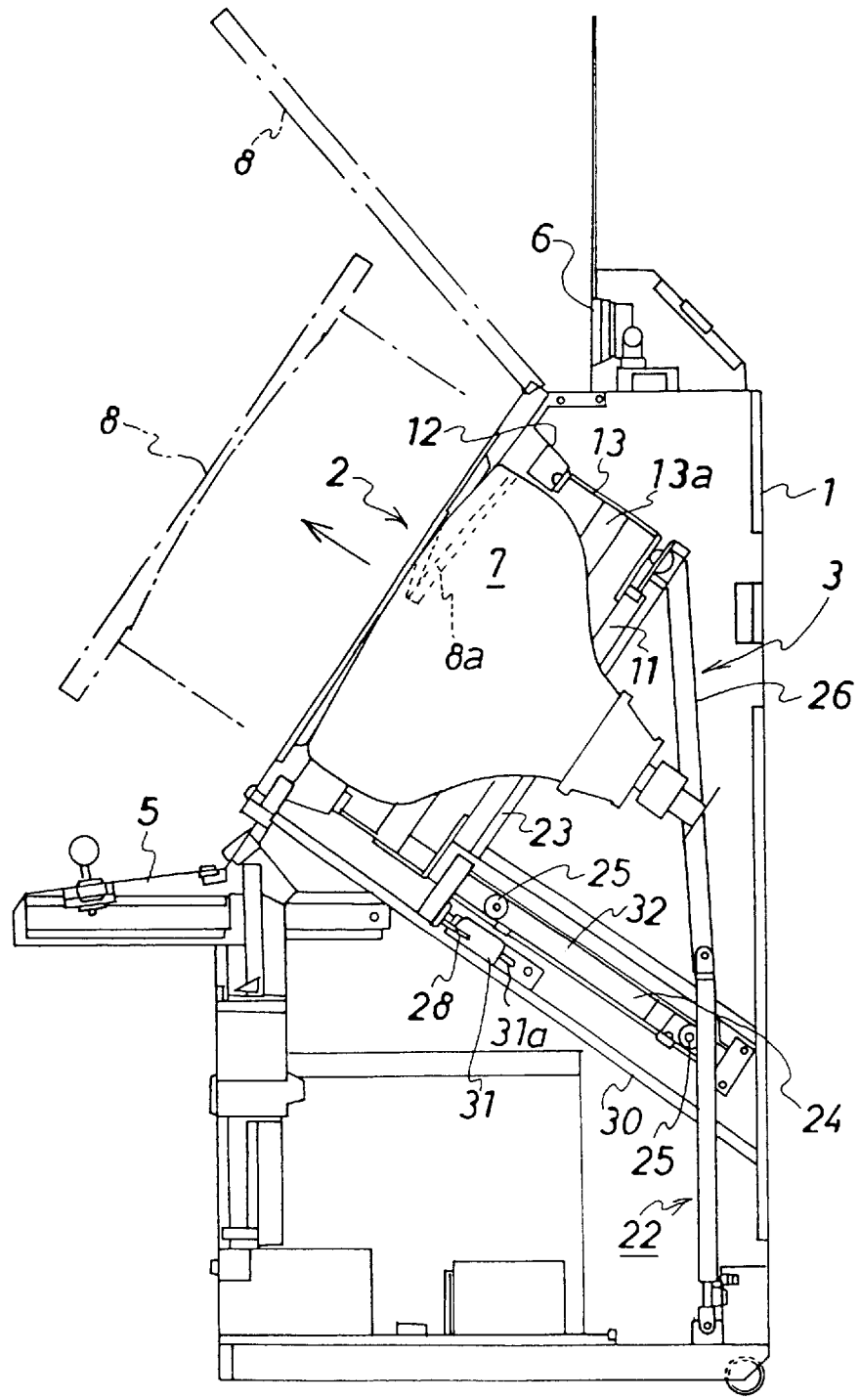
FIG. 1 shows a side view of a built-in monitor apparatus according to an embodiment of this invention.
Figure 2:
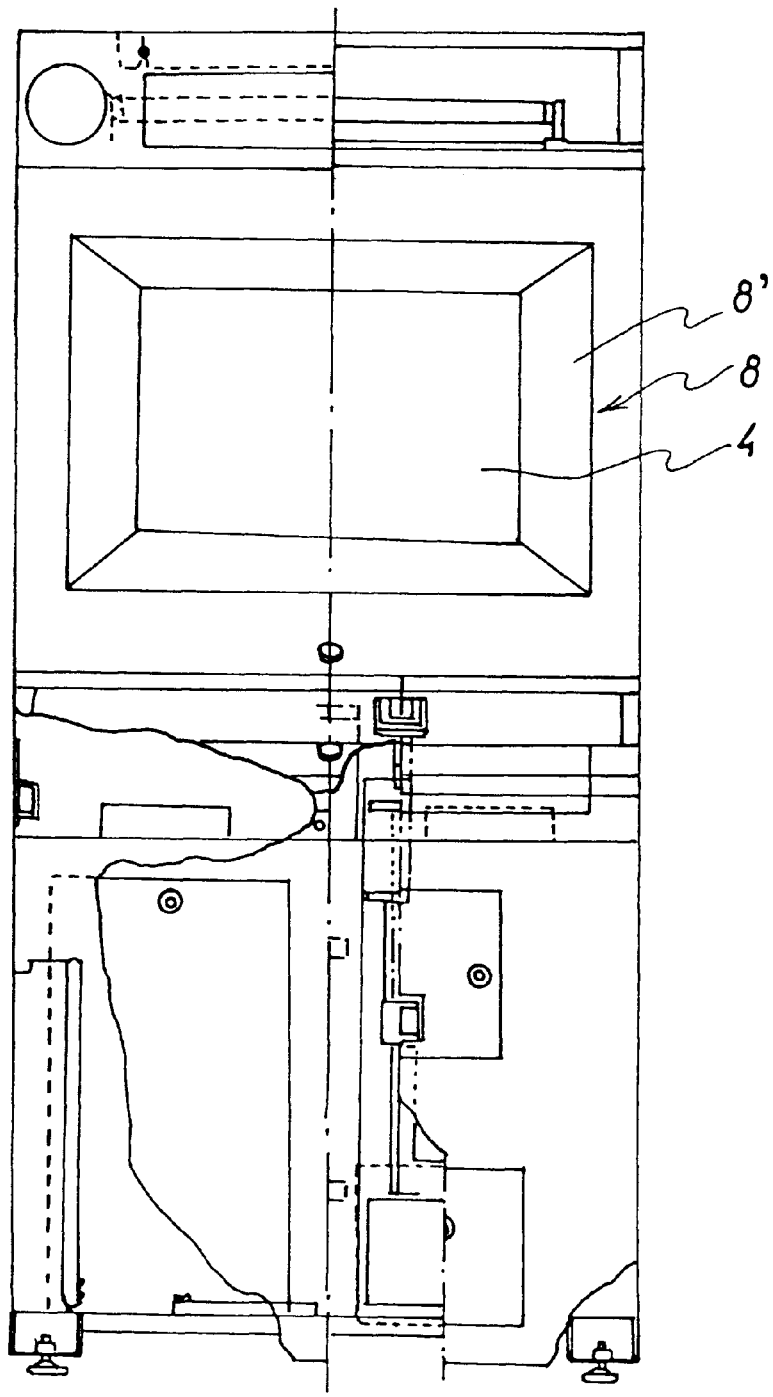
FIG. 2 is a front view of the built-in monitor apparatus shown in FIG. 1.

FIGS. 1 and 2 respectively shows a side view and a front view of the whole structure of a built-in monitor apparatus according to this invention.

In FIGS. 1 and 2, the reference numeral 1 denotes a casing housing therein a monitor unit 2 and a base unit 3. On the front side thereof is disposed an upwardly inclined rectangular picture screen 4 for monitoring an image. In front of the picture screen 4, there is disposed an operating board 5, while on the top of the picture screen 4, there is arranged a display portion 6 comprising a speaker.

Figure 3:
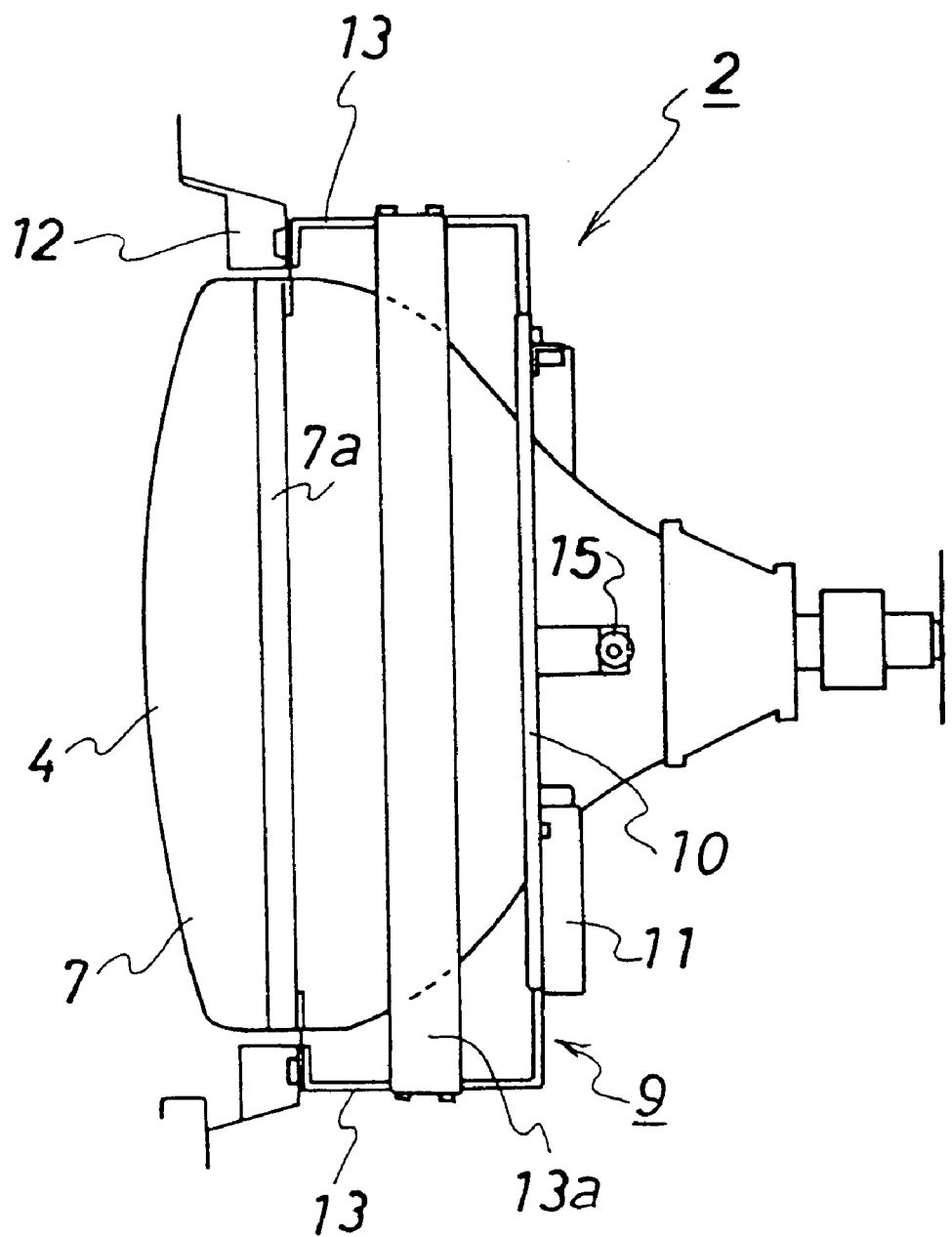
FIG. 3 is a side view of a monitor unit.
Figure 4:
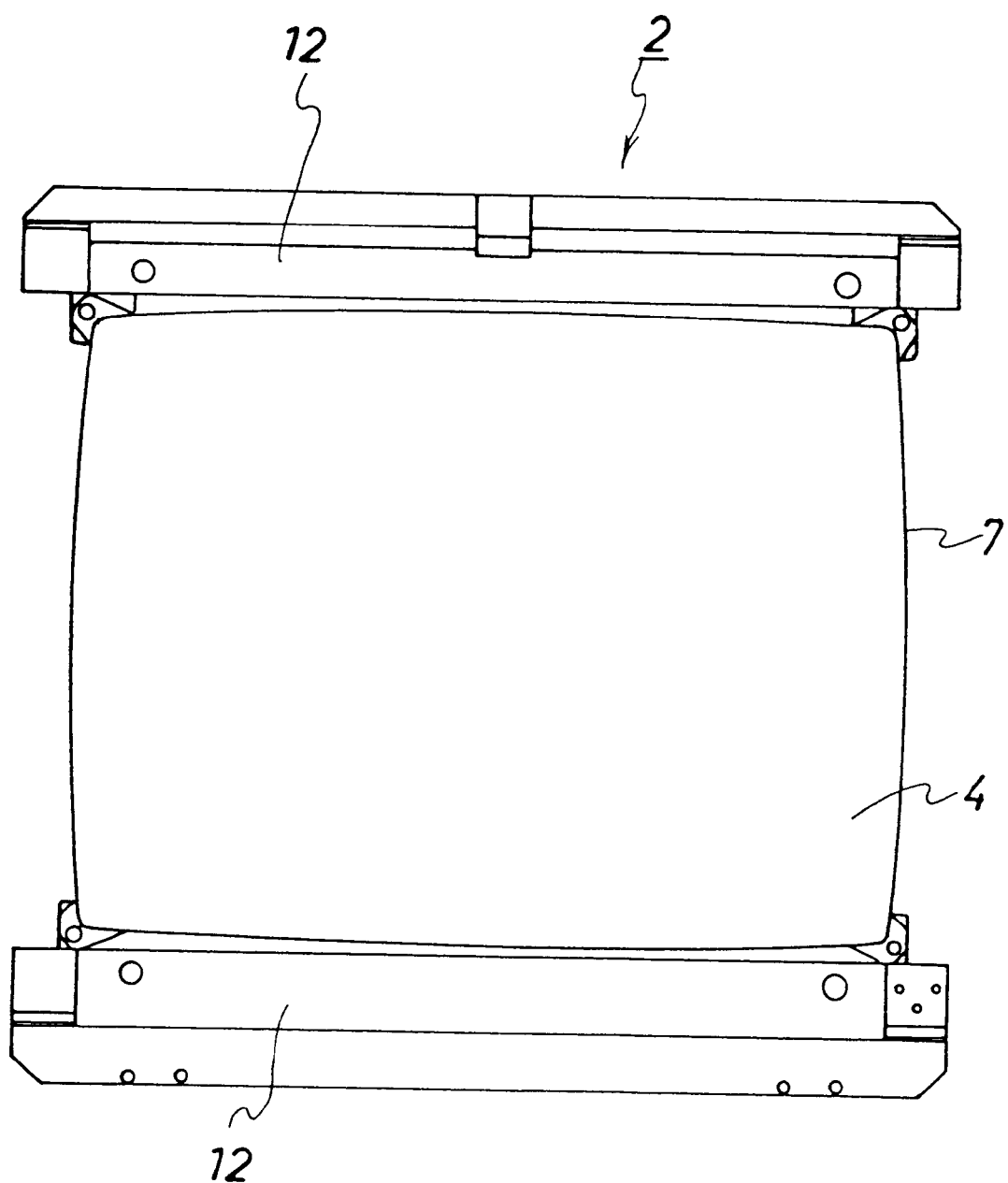
FIG. 4 is a front view of a monitor unit.
Figure 5:
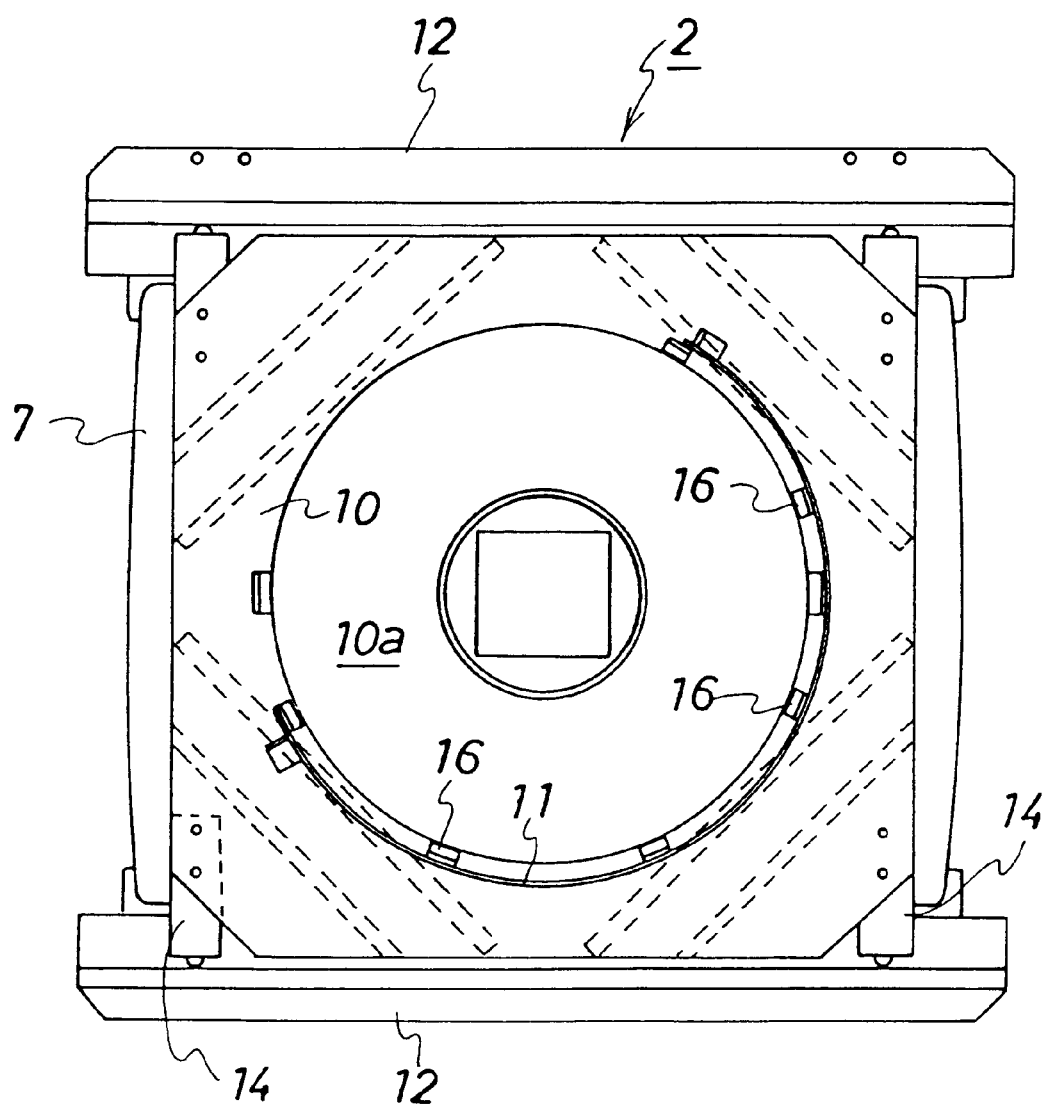
FIG. 5 shows the back of the monitor unit shown in FIG. 3.

The monitor unit 2 comprises, as shown in FIGS. 3 to 5, a cathode-ray tube, an escutcheon 8L surrounding the periphery of the picture screen 4 of the cathode-ray tube 7, a transparent door 8 (see FIGS. 9 and 10) sustained by a rectangular brim member for covering the upper surfaces of the picture screen 4 and the escutcheon 8L, a box-like upper frame 9 securing and supporting the cathode-ray tube 7, while surrounding the outer wall of the cathode-ray tube 7, a plate 10 disposed behind the upper frame 9 and having a circular through-hole 10a which is disposed concentrical with the axis of the cathode-ray tube 7, and a bracket 11 for guiding the rotation of the cathode-ray tube 7, which is arranged along arc of the circular through-hole 10a of the plate 10.

The box-like upper frame 9 is constructed into a box-like shape so as to surround the middle portion of the cathode-ray tube 7. To be more specific, the box-like upper frame 9 is attached to a securing portion 7a fixed to the side wall of the cathode-ray tube 7, and comprises as main components a pair of brackets 12 arranged in parallel with each other at the upper and the lower portions of the picture screen 4 for attaching a transparent door, plate-like frames 13, each being disposed rearward to both ends of brackets 12, and a back surface bracket 14 fixed to the plate-like frames 13.

The reference numeral 13a denotes a reinforcing bracket for reinforcing the plate-like frames 13.

Figure 9:
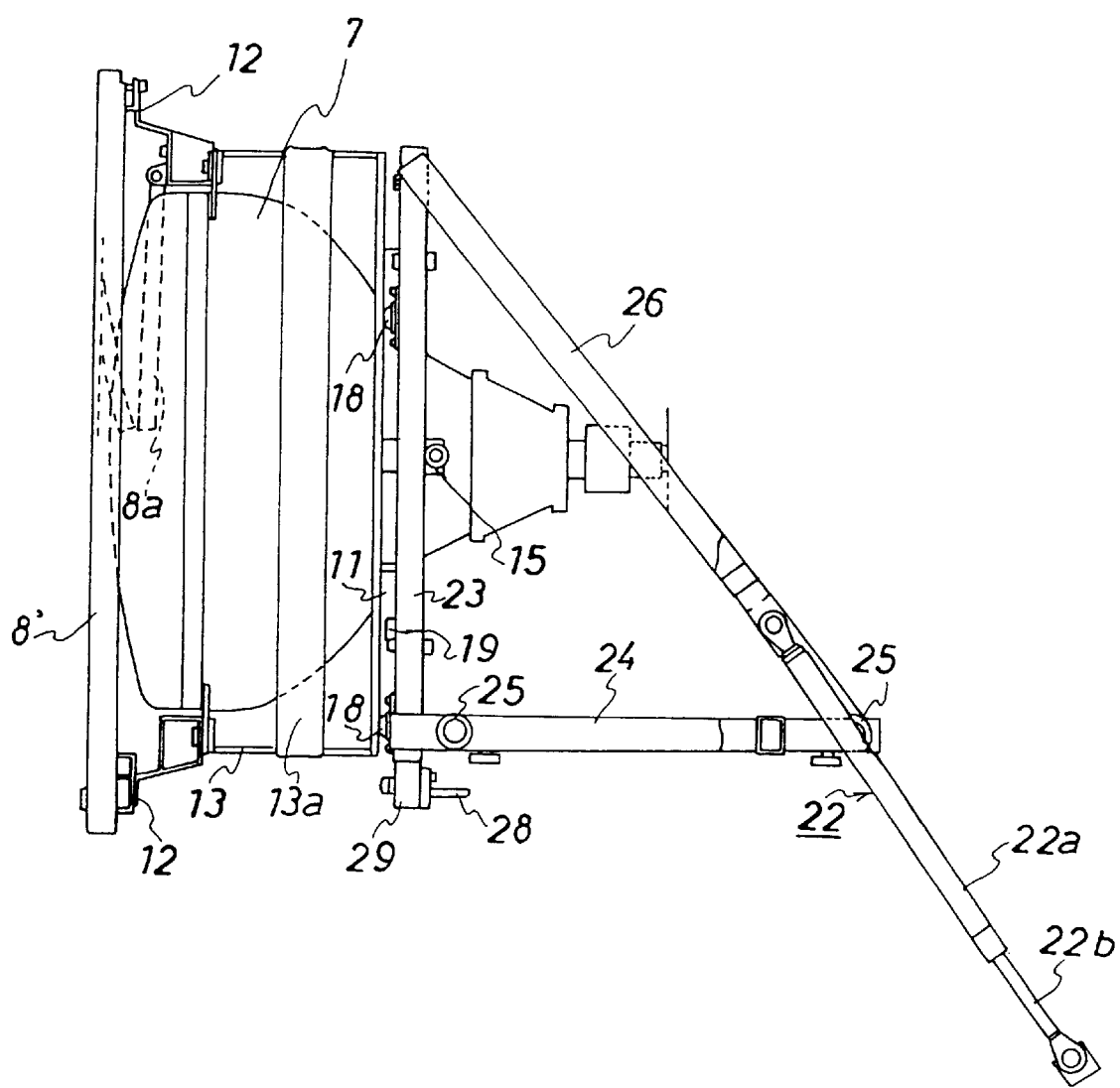
FIG. 9 shows a side view where the monitor unit shown in FIG. 3 is linked to the base unit shown in FIG. 6.
Figure 10:
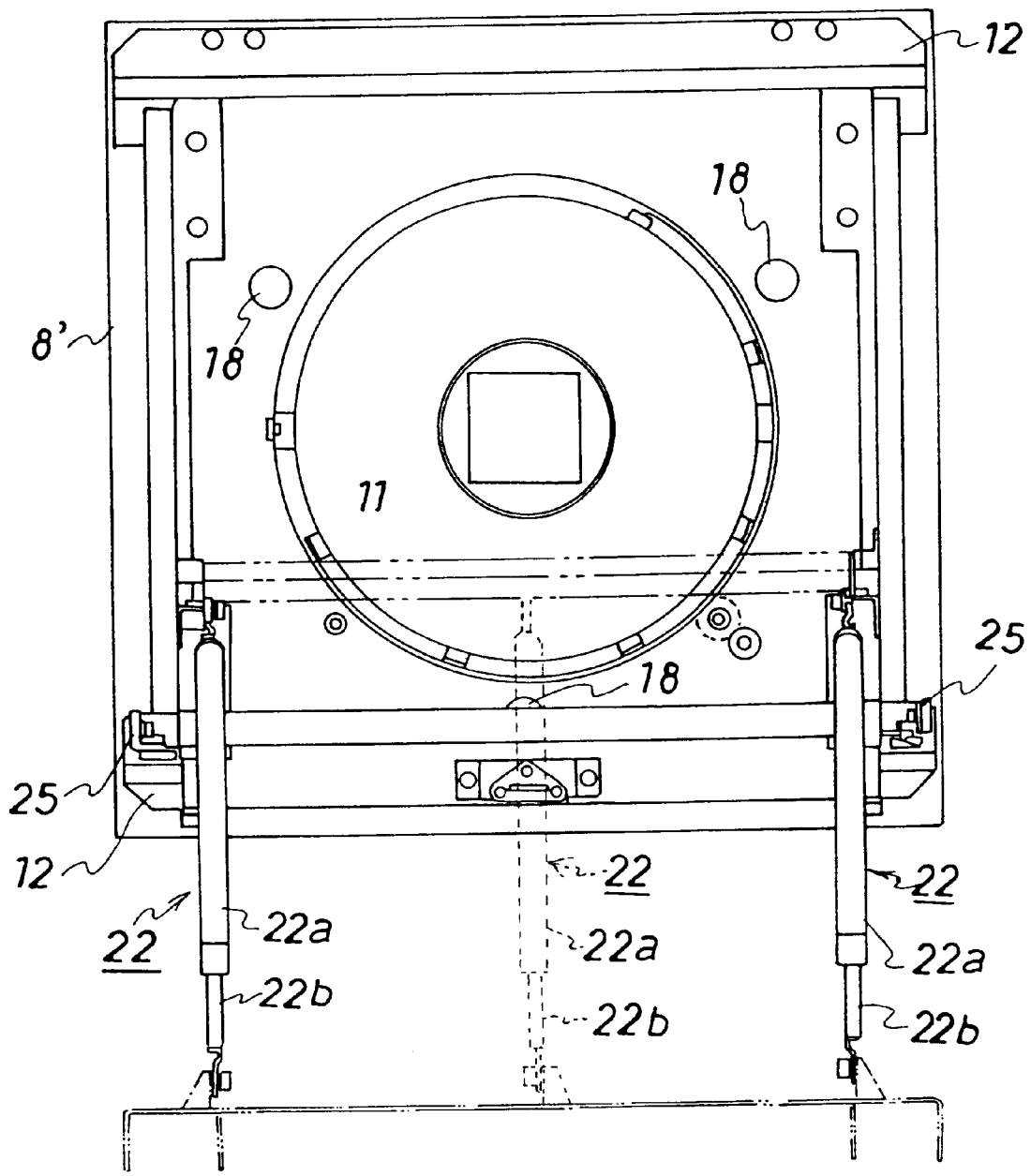
FIG. 10 is a back side view of the linked body shown in FIG. 9.

To this back surface bracket 14 is secured the plate 10 having the circular through-hole 10a for inserting therein a rear portion of the cathode-ray tube 7. To this plate 10 is mounted a pair of roller mechanisms 15 at the diametrically opposite portion thereof, which are rotatably engaged with the rotating plate of the base unit 3 as shown in FIGS. 9 and 10.

The bracket 11 for guiding the rotation of the cathode-ray tube 7 is mounted by way of a plurality of attaching members 16 on the plate 10 in such a manner that the bracket 11 perpendicularly projects from the plate 10 while forming a locus of 220-degree arc on the plate 10. The bracket 11 is supported by a pair of roller mounted on the base unit 3 as described hereinafter so as to be rotated in a 90-degree arc, thereby effecting the rotation in a 90-degree arc of the whole body of the monitor unit 2 so as to make it possible to change the posture of the picture screen 4 from a vertically elongated state to a horizontally elongated state, and vice versa.

By the way, the transparent door 8 is attached to the bracket 12 so as to be pivotally rotated by means of stay 8a as shown in FIG. 1.

Figure 6:
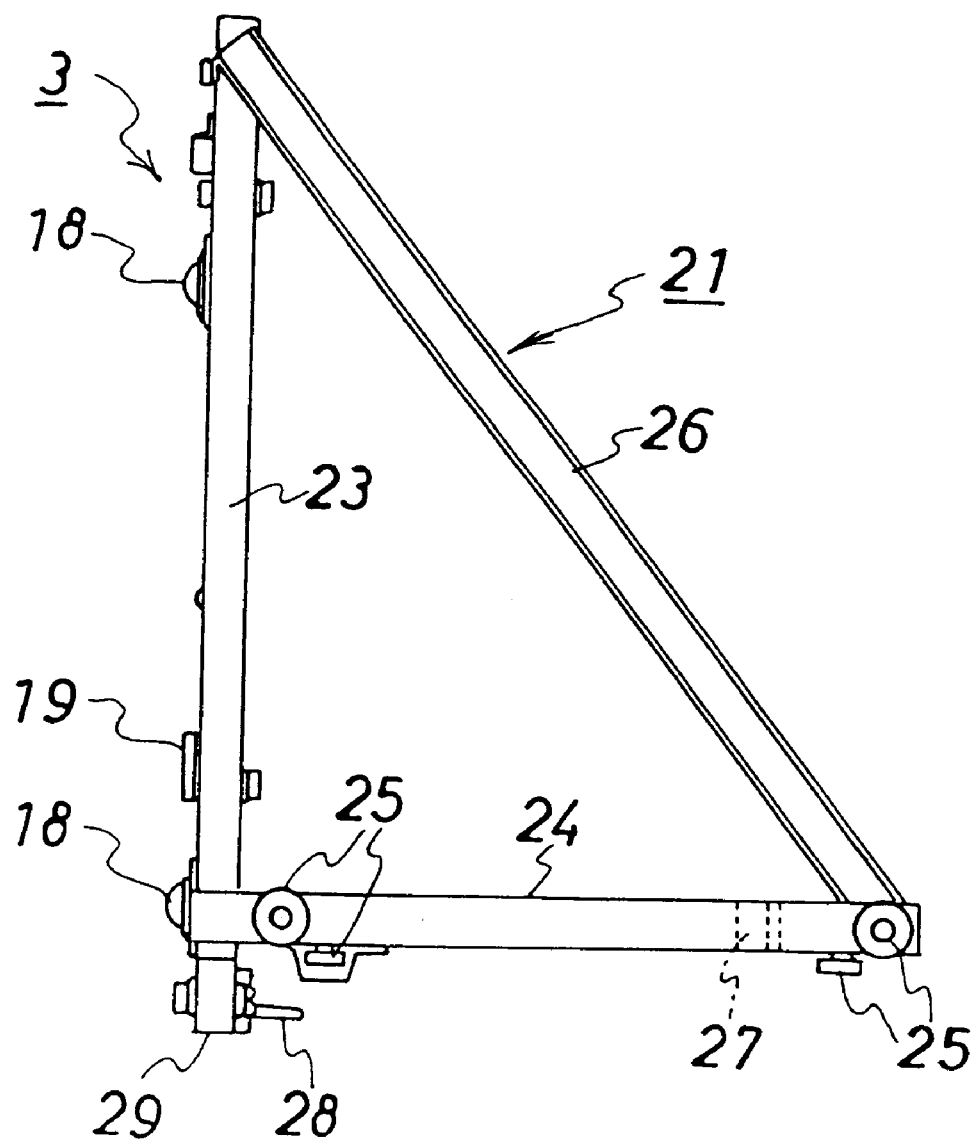
FIG. 6 shows a base unit.
Figure 7:
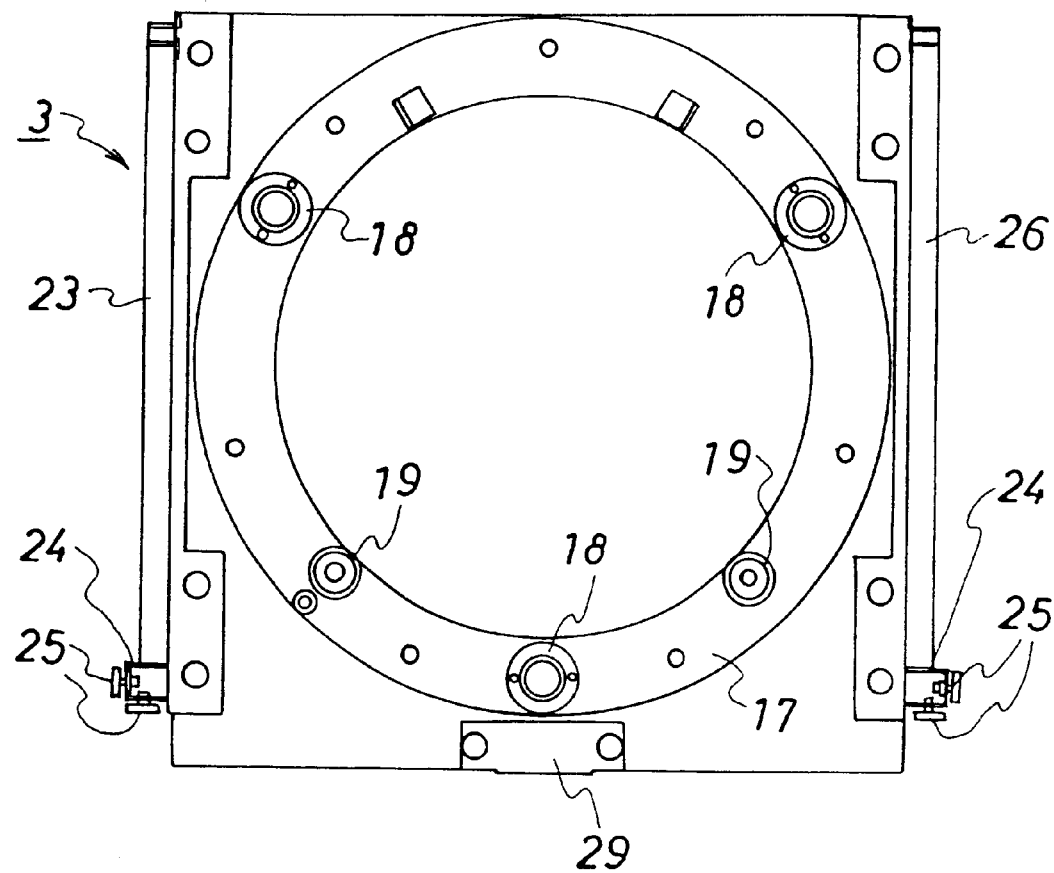
FIG. 7 shows a front view of the base unit shown in FIG. 6.
Figure 8:
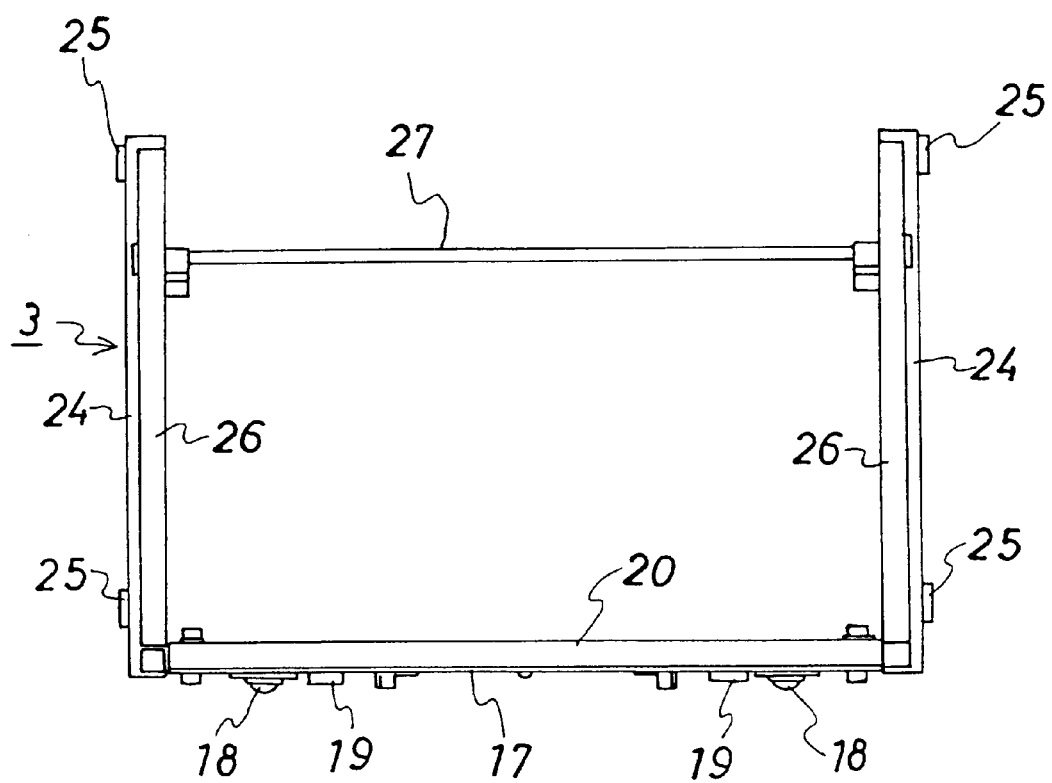
FIG. 8 shows a plan view of the base unit shown in FIG. 6.

The base unit 3 comprises, as shown in FIGS. 6 to 8, a monitor rotating plate 17 having a ring-like plane, which is adapted to be engaged via the roller mechanisms 15 with the bracket 11, a plurality of ball castors 18 mounted at prescribed intervals on the upper surface of the monitor rotating plate 17 so as to be contacted with the back surface of the plate 10, a pair of roller 19 kept apart from each other for rotating the cathode-ray tube, which are mounted on the upper surface of the monitor rotating plate 17, and adapted to contact with the lower surface of the bracket 11 so as to rotatably support the bracket 11, a monitor rotating plate-fixing bracket 20 for fixing the monitor rotating plate 17, a lower frame 21 for supporting and securing the monitor rotating plate-fixing bracket 20, and a stretchable damper 22, whose upper portion is rotatably connected to the rear portion of the lower frame 21 so as to support the lower frame 21 while allowing ascending and descending movement thereof.

The lower frame 21 comprises a pair of first bar-like frame 23 disposed along the outside of the monitor rotating plate-fixing bracket 20, a pair of second bar-like frame 24 having an angled cross section, one end of which is perpendicularly fixed to the lower end of the first bar-like frame 23, a plurality of guide rollers rotatably attached near the both ends of the second bar-like frame 24, some of which being disposed vertically and others disposed horizontally, each directed in a right angle with respect to the rotational angle of the monitor unit, a pair of third bar-like frame 26, one end of which is connected to the rear extended portion of the second bar-like frame 24, and the other end of which is connected to the upper portion of the first bar-like frame 23 so as to be disposed in a slanted state, and a reinforcing bar 27 for linking and reinforcing the pair of the second bar-like frame 24.

At the lower end of the first bar-like frame 23 is attached a hook-mounting plate 29 provided with a ring-like hook 28 as shown in FIGS. 1 and 9.

Meanwhile, the casing 1 is provided with a supporting plate 30 disposed in parallel with and below the second bar-like frame 24. On this supporting plate 30 is mounted a locking mechanism 31 so as to fasten the base unit 3 en bloc.

In this embodiment, the locking mechanism 31 is provided at the forward portion thereof with a fitting groove into which the hook 28 is adapted to be fitted in to automatically effecting the locking. The disengagement of the locking mechanism 31 from the hook 28 can be effected by manually operating a release lever 31a (see FIG. 1).

At the inner side of the casing 1 is disposed a guide rail 32 having a U-shaped groove and linearly and obliquely extending along the side surface of the second bar-like frame 24 toward the monitor unit 2. Each of guide rollers 25, which is vertically or horizontally disposed, is fitted in the U-shaped groove of the guide rail 32 so as to enable the base unit 3 to ascend or descend along the guide rail 32 together with the monitor unit 2.

The stretchable damper 22 comprises a cylinder member 22a and a rod 22b slidably inserted into the cylinder member 22a. As an energizing (buffering) medium for this damper 22, a gas may be employed. The upper end of this damper 22 is rotatably engaged with the lower portion of the third bar-like frame 26, and the lower end of the damper 22 is rotatably engaged with the bottom portion of the casing 1 so that the damper 22 can be rotated or stretched or shrinked in conformity with the ascending or descending movement of the base unit 3. This stretchable damper 22 may be installed only at the central portion of the casing 1 as shown in phantom line in FIG. 10, or may be installed at the central portion of the casing 1 together with those installed at both sides of the casing so as to use it as a supplementary damper.

As mentioned above, the casing 1 is provided with the speaker 6 and the operating board 5 disposed forward to the lower portion of the picture screen 4. Further, in the inner space of the casing 1 is disposed a substrate-mounting portion 41 for detachably mounting a semiconductor substrate.

This substrate-mounting portion 41 is provided at its base end portion with terminals to be connected with the speaker 6, the cathode-ray tube 7 and the operating board 5 having joy-sticks and operating buttons so as to connect them with the input/output terminals of the semiconductor substrate.

In this semiconductor substrate is furnished with an electronic circuit stored therein with a software for a television game, so that a various kinds of television games can be enjoyed by changing the semiconductor substrate.

By connecting the semiconductor substrate to the mounting portion 41, controlling of the speaker 6, the cathode-ray tube 7 and the operating board 5 can be effected.

Next, the operation of changing the posture of the picture screen of this monitor built-in apparatus from vertically elongated state to a horizontally elongated state, and vice versa will be explained.

First, the releasing lever 31a is manipulated through an opening provided at the bottom of the casing 1 so as to disengage the hook 28 disposed at the lower end of the first bar-like frame 23 from the locking mechanism 31. When the hook 28 is disengaged in this manner, the monitor unit 2 and the base unit 3 are forced to move upward due to the upwardly energized force of the stretchable damper 22, and at the same time the transparent door 8 can be easily lifted upward by holding the peripheral brim portion of the transparent door 8.

At this moment, since the guide rollers 25 are free to slide along the guide rails 32, the monitor unit 2 can be obliquely pulled upward together with the base unit 3 out of the casing 1 along the extended direction of the guide rails 32.

When the upper frame 9 of the monitor unit 2 is substantially exposed out of the casing 1, the monitor unit 2 is rotated in a 90-degree arc.

Since the major portion of the upper frame 9 of the monitor unit 2 is projected out of the casing 1, the operation of rotating the monitor unit 2 is no more hindered by the existence of the casing 1.

After finishing this rotating operation, the monitor unit 2 is returned, while being held by hands, back to the original position in the casing 1 and then the hook 28 is engaged with the locking mechanism 31.

During this operation of returning the monitor unit 2 to the casing 1, the cushioning action of the stretchable damper. 22 is effected to alleviate any shock to the whole apparatus.

As explained above, according to the built-in monitoring apparatus of this invention, the cathode-ray tube for monitoring can be shifted forward while keeping its original inclined state to be taken out of the casing 1, and then the conversion of the posture of the picture screen is carried out. Therefore, the conversion operation of the posture of the picture screen becomes simple and can be easily performed.

Further, since the conversion operation of the picture screen is performed after dislocating the monitor unit to a position in front of the casing, there is no possibility of accident that the monitor unit is collided during the conversion operation against the casings of the monitor built-in apparatus which are arrayed at both sides of this monitor built-in apparatus whose monitor unit is being rotated.

Accordingly, when many a number of monitor built-in apparatus such as electronic game machines are desired to be arrayed in a play room, the space for accommodating the monitor built-in apparatus can be minimized as compared with the conventional monitor built-in apparatus, thus saving the installation space therefor.

Since the monitor unit is energized upon the release of the locking mechanism to move forward along the guide rail due to the energizing force of the stretchable damper, the screen-posture conversion operation can be easily conducted.

What is claimed is:

1. A built-in monitor apparatus wherein an rectangular picture screen housed in a casing is adapted to be changed from a vertically elongated state to a horizontally elongated state, and vice versa; which is characterized to comprise;

a monitor unit comprising a cathode-ray tube;

a base unit comprising a frame for rotatably supporting said monitor unit, and a stretchable damper biased to be moved forward, each end of said damper being pivotally connected to a portion between said frame and said casing;

a guide roller mounted on said frame, and adapted to slide along a guide rail provided within said casing; and a locking means for restraining the movement of said frame within a prescribed position of said casing.

2. A built-in monitor apparatus according to claim 1, wherein said monitor unit comprises;

a cathode-ray tube;

an escutcheon surrounding the periphery of the picture screen of the cathode-ray tube;

a transparent door for covering the upper surface of the picture screen;

a box-like upper frame securing and supporting the cathode-ray tube, while surrounding the outer wall of the cathode-ray tube;

a plate disposed behind the upper frame and having a circular through-hole which is disposed concentrical with the axis of the cathode-ray tube; and a bracket for guiding the rotation of the cathode-ray tube, which is arranged along arc of the circular through-hole of the plate.

3. A built-in monitor apparatus according to claim 1, wherein said base unit comprises;

a monitor rotating plate having a ring-like plane, which is adapted to be engaged via the roller mechanisms with the bracket;

a plurality of ball castors mounted at prescribed intervals on the upper surface of the monitor rotating plate so as to be contacted with the back surface of the plate;

a pair of roller kept apart from each other for rotating the cathode-ray tube, which are mounted on the upper surface of the monitor rotating plate, and adapted to contact with the lower surface of the bracket so as to rotatably support the bracket;

a monitor rotating plate-fixing bracket for fixing the monitor rotating plate;

a lower frame for supporting and securing the monitor rotating plate-fixing bracket; and a stretchable damper, whose upper portion is rotatably connected to the rear portion of the lower frame so as to support the lower frame while allowing ascending and descending movement thereof.

4. A built-in monitor apparatus according to claim 1, wherein, the casing is provided with a speaker, an operating board disposed forward to the lower portion of the picture screen, and a substrate-mounting portion for detachably mounting a semiconductor substrate to be connected with the speaker, the cathode-ray tube and the operating board for controlling them.

* * * * *